(12) United States Patent
Viola et al.

(10) Patent No.: US 9,163,952 B2
(45) Date of Patent: Oct. 20, 2015

(54) SUGGESTIVE MAPPING

(75) Inventors: Paul A. Viola, Seattle, WA (US);
Zhaowei Jiang, Palo Alto, CA (US);
John C. Krumm, Redmond, WA (US);
Matthew Graham Dyor, Bellevue, WA (US); Eric J. Horvitz, Kirkland, WA (US); Lili Cheng, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 137 days.

(21) Appl. No.: 13/088,040

(22) Filed: Apr. 15, 2011

(65) Prior Publication Data

US 2012/0265433 A1 Oct. 18, 2012

(51) Int. Cl.
*G01C 21/36* (2006.01)

(52) U.S. Cl.
CPC .......... *G01C 21/3617* (2013.01); *G01C 21/362* (2013.01)

(58) Field of Classification Search
CPC .......................... G01C 21/3617; G01C 21/362
USPC .................. 701/410, 411, 414, 415, 420, 424
See application file for complete search history.

(56) References Cited

U.S. PATENT DOCUMENTS

| | | | |
|---|---|---|---|
| 4,760,530 A | 7/1988 | Liden | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,848,395 A | 12/1998 | Edgar et al. | |
| 5,948,040 A | 9/1999 | DeLorme et al. | |
| 5,978,732 A | 11/1999 | Kakitani et al. | |
| 6,084,543 A | 7/2000 | Iizuka | |
| 6,092,014 A | 7/2000 | Okada | |
| 6,119,065 A | 9/2000 | Shimada et al. | |
| 6,122,572 A | 9/2000 | Yavnai | |
| 6,154,745 A | 11/2000 | Kari et al. | |

(Continued)

FOREIGN PATENT DOCUMENTS

| | | |
|---|---|---|
| DE | 10042983 A1 | 3/2002 |
| EP | 1085484 A2 | 3/2001 |

(Continued)

OTHER PUBLICATIONS

"About Project Playlist," retrieved on Apr. 9, 2008 from <<http://www.playlist.com/static/node/491.html>>, 3 pages.

(Continued)

*Primary Examiner* — Nicholas Kiswanto
(74) *Attorney, Agent, or Firm* — Dan Choi; Judy Yee; Micky Minhas

(57) ABSTRACT

A suggestive mapping device may predict, suggest, and/or provide potential destinations to a user. Additionally, the device may store historical location data of the user, determine a travel vector of the user, and predict the destination of the user based at least in part on the historical location data and/or the travel vector. Further, the device may provide hands-free maps to destinations when the user does not know the address at least by receiving contextual data of the user and/or contextual data of the user's contacts. Such hands-free, suggestive mapping devices may facilitate more effective navigation.

19 Claims, 5 Drawing Sheets

(56) References Cited

U.S. PATENT DOCUMENTS

| | | |
|---|---|---|
| 6,292,687 B1 | 9/2001 | Lowell et al. |
| 6,298,304 B1 | 10/2001 | Theimer |
| 6,317,718 B1 | 11/2001 | Fano |
| 6,321,161 B1 | 11/2001 | Herbst et al. |
| 6,353,398 B1 | 3/2002 | Amin et al. |
| 6,356,905 B1 | 3/2002 | Gershman et al. |
| 6,401,085 B1 | 6/2002 | Gershman et al. |
| 6,418,424 B1 | 7/2002 | Hoffberg et al. |
| 6,446,076 B1 | 9/2002 | Burkey et al. |
| 6,466,232 B1 | 10/2002 | Newell et al. |
| 6,480,783 B1 | 11/2002 | Myr |
| 6,513,046 B1 | 1/2003 | Abbott, III et al. |
| 6,526,350 B2 | 2/2003 | Sekiyama |
| 6,549,915 B2 | 4/2003 | Abbott, III et al. |
| 6,574,351 B1 | 6/2003 | Miyano |
| 6,587,785 B2 | 7/2003 | Jijina et al. |
| 6,611,754 B2 | 8/2003 | Klein |
| 6,615,130 B2 | 9/2003 | Myr |
| 6,618,593 B1 | 9/2003 | Drutman et al. |
| 6,622,160 B1 | 9/2003 | Horvitz |
| 6,672,506 B2 | 1/2004 | Swartz et al. |
| 6,700,504 B1 | 3/2004 | Aslandogan et al. |
| 6,714,967 B1 | 3/2004 | Horvitz |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,845,370 B2 | 1/2005 | Burkey et al. |
| 6,889,382 B1 | 5/2005 | Anderson |
| 6,892,196 B1 | 5/2005 | Hughes |
| 6,931,598 B2 | 8/2005 | Price et al. |
| 6,954,735 B1 | 10/2005 | Djupsjobacka et al. |
| 7,010,501 B1 | 3/2006 | Roslak et al. |
| 7,040,541 B2 | 5/2006 | Swartz et al. |
| 7,063,263 B2 | 6/2006 | Swartz et al. |
| 7,069,310 B1 | 6/2006 | Bartholomew |
| 7,071,842 B1 | 7/2006 | Brady, Jr. |
| 7,103,470 B2 | 9/2006 | Mintz |
| 7,149,741 B2 | 12/2006 | Burkey et al. |
| 7,171,378 B2 | 1/2007 | Petrovich et al. |
| 7,195,157 B2 | 3/2007 | Swartz et al. |
| 7,200,566 B1 | 4/2007 | Moore et al. |
| 7,227,498 B2 | 6/2007 | Soliman |
| 7,233,861 B2 * | 6/2007 | Van Buer et al. ............ 701/424 |
| 7,245,925 B2 | 7/2007 | Zellner |
| 7,385,501 B2 | 6/2008 | Miller et al. |
| 7,386,477 B2 | 6/2008 | Fano |
| 7,389,179 B2 | 6/2008 | Jin et al. |
| 7,403,774 B2 | 7/2008 | Chandra et al. |
| 7,451,041 B2 | 11/2008 | Laumeyer et al. |
| 7,577,522 B2 | 8/2009 | Rosenberg |
| 7,589,628 B1 | 9/2009 | Brady, Jr. |
| 7,596,513 B2 | 9/2009 | Fargo |
| 7,603,229 B2 | 10/2009 | Goldberg et al. |
| 7,610,151 B2 | 10/2009 | Letchner et al. |
| 7,617,042 B2 | 11/2009 | Horvitz et al. |
| 7,630,828 B2 * | 12/2009 | Tajima et al. ................ 701/118 |
| 7,676,583 B2 | 3/2010 | Eaton et al. |
| 7,720,715 B1 | 5/2010 | Nemer |
| 7,739,040 B2 | 6/2010 | Horvitz |
| 7,797,267 B2 | 9/2010 | Horvitz |
| 7,813,870 B2 | 10/2010 | Downs et al. |
| 7,885,761 B2 * | 2/2011 | Tajima et al. ................ 701/439 |
| 7,899,611 B2 | 3/2011 | Downs et al. |
| 7,912,637 B2 | 3/2011 | Horvitz et al. |
| 7,941,269 B2 | 5/2011 | Laumeyer et al. |
| 8,020,104 B2 | 9/2011 | Robarts et al. |
| 8,024,112 B2 | 9/2011 | Krumm et al. |
| 8,121,891 B2 | 2/2012 | Handel et al. |
| 8,166,392 B2 | 4/2012 | Horvitz |
| 8,473,197 B2 | 6/2013 | Horvitz |
| 8,533,097 B2 | 9/2013 | Maass |
| 2001/0029425 A1 | 10/2001 | Myr |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0055165 A1 | 12/2001 | McCarthy et al. |
| 2002/0002504 A1 | 1/2002 | Engel et al. |
| 2002/0032689 A1 | 3/2002 | Abbott et al. |
| 2002/0044152 A1 | 4/2002 | Abbott et al. |
| 2002/0052930 A1 | 5/2002 | Abbott et al. |
| 2002/0052963 A1 | 5/2002 | Abbott et al. |
| 2002/0054130 A1 | 5/2002 | Abbott et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0194061 A1 | 12/2002 | Himmel et al. |
| 2003/0046401 A1 | 3/2003 | Abbott et al. |
| 2003/0154476 A1 | 8/2003 | Abbott et al. |
| 2003/0172368 A1 | 9/2003 | Alumbaugh et al. |
| 2003/0229471 A1 | 12/2003 | Guralnik et al. |
| 2003/0229895 A1 | 12/2003 | Jasinschi et al. |
| 2004/0015557 A1 | 1/2004 | Horvitz |
| 2004/0017392 A1 | 1/2004 | Welch |
| 2004/0019603 A1 | 1/2004 | Haigh et al. |
| 2004/0068364 A1 | 4/2004 | Zhao et al. |
| 2004/0070602 A1 | 4/2004 | Kobuya et al. |
| 2004/0125144 A1 | 7/2004 | Yoon |
| 2004/0153445 A1 | 8/2004 | Horvitz et al. |
| 2004/0172457 A1 | 9/2004 | Horvitz |
| 2004/0172483 A1 | 9/2004 | Horvitz |
| 2004/0189475 A1 | 9/2004 | Cooper et al. |
| 2004/0201500 A1 | 10/2004 | Miller et al. |
| 2004/0267965 A1 | 12/2004 | Vasudevan et al. |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0091118 A1 | 4/2005 | Fano |
| 2005/0097005 A1 | 5/2005 | Fargo |
| 2005/0144318 A1 | 6/2005 | Chang |
| 2005/0182645 A1 | 8/2005 | Ehlis et al. |
| 2005/0216186 A1 | 9/2005 | Dorfman et al. |
| 2005/0219120 A1 | 10/2005 | Chang |
| 2005/0228553 A1 | 10/2005 | Tryon |
| 2005/0266858 A1 | 12/2005 | Miller et al. |
| 2005/0272442 A1 | 12/2005 | Miller et al. |
| 2006/0019676 A1 | 1/2006 | Miller et al. |
| 2006/0047416 A1 | 3/2006 | Goldberg et al. |
| 2006/0070012 A1 | 3/2006 | Milener et al. |
| 2006/0138219 A1 | 6/2006 | Brzezniak et al. |
| 2006/0195789 A1 | 8/2006 | Rogers et al. |
| 2006/0241862 A1 | 10/2006 | Ichihara et al. |
| 2006/0271277 A1 | 11/2006 | Hu et al. |
| 2006/0271286 A1 | 11/2006 | Rosenberg |
| 2006/0277474 A1 | 12/2006 | Robarts et al. |
| 2006/0294084 A1 | 12/2006 | Patel et al. |
| 2007/0011148 A1 | 1/2007 | Burkey et al. |
| 2007/0033516 A1 | 2/2007 | Khosla et al. |
| 2007/0060108 A1 | 3/2007 | East et al. |
| 2007/0073477 A1 | 3/2007 | Krumm et al. |
| 2007/0083497 A1 | 4/2007 | Martinez |
| 2007/0118279 A1 | 5/2007 | Kudo |
| 2007/0124157 A1 | 5/2007 | Laumeyer et al. |
| 2007/0129072 A1 | 6/2007 | Yamato et al. |
| 2007/0150369 A1 | 6/2007 | Zivin |
| 2007/0156334 A1 | 7/2007 | Vu |
| 2007/0208619 A1 | 9/2007 | Branam et al. |
| 2007/0208991 A1 | 9/2007 | Rider |
| 2007/0214180 A1 | 9/2007 | Crawford |
| 2007/0255621 A1 | 11/2007 | Mason |
| 2008/0004794 A1 | 1/2008 | Horvitz |
| 2008/0004802 A1 | 1/2008 | Horvitz |

(56) References Cited

U.S. PATENT DOCUMENTS

| | | | |
|---|---|---|---|
| 2008/0005055 | A1 | 1/2008 | Horvitz |
| 2008/0088424 | A1 | 4/2008 | Imura et al. |
| 2008/0090591 | A1 | 4/2008 | Miller et al. |
| 2008/0091537 | A1 | 4/2008 | Miller et al. |
| 2008/0109307 | A1 | 5/2008 | Ullah |
| 2008/0126191 | A1 | 5/2008 | Schiavi |
| 2008/0140712 | A1 | 6/2008 | Weber et al. |
| 2008/0161018 | A1 | 7/2008 | Miller et al. |
| 2008/0215436 | A1 | 9/2008 | Roberts |
| 2008/0247377 | A1 | 10/2008 | Van Horn et al. |
| 2008/0261516 | A1 | 10/2008 | Robinson |
| 2008/0263036 | A1 | 10/2008 | Yamamoto |
| 2008/0288494 | A1 | 11/2008 | Brogger et al. |
| 2009/0005067 | A1 | 1/2009 | Ernst et al. |
| 2009/0006297 | A1 | 1/2009 | Horvitz et al. |
| 2009/0036148 | A1 | 2/2009 | Yach |
| 2009/0037838 | A1 | 2/2009 | Gedye et al. |
| 2009/0125226 | A1 | 5/2009 | Laumeyer et al. |
| 2009/0125380 | A1 | 5/2009 | Otto et al. |
| 2009/0319672 | A1 | 12/2009 | Reisman |
| 2010/0010733 | A1 | 1/2010 | Krumm |
| 2010/0036601 | A1 | 2/2010 | Ozawa et al. |
| 2010/0070171 | A1 | 3/2010 | Barbeau et al. |
| 2010/0094707 | A1 | 4/2010 | Freer |
| 2010/0106603 | A1 | 4/2010 | Dey et al. |
| 2010/0185388 | A1 | 7/2010 | Horvitz |
| 2010/0188575 | A1 | 7/2010 | Salomons et al. |
| 2010/0198860 | A1 | 8/2010 | Burnett et al. |
| 2010/0250348 | A1 | 9/2010 | Dunbar |
| 2010/0332315 | A1 | 12/2010 | Kamar et al. |
| 2010/0333137 | A1 | 12/2010 | Hamano et al. |
| 2011/0004513 | A1 | 1/2011 | Hoffberg |
| 2011/0022464 | A1 | 1/2011 | Dunn et al. |
| 2011/0085447 | A1 | 4/2011 | Kholaif et al. |

FOREIGN PATENT DOCUMENTS

| | | | |
|---|---|---|---|
| EP | 1929456 | A1 | 6/2008 |
| EP | 2293233 | A1 | 3/2011 |
| JP | 2007083678 | A | 3/1995 |
| JP | 2008271277 | A | 10/1996 |
| JP | 10132593 | A | 5/1998 |
| JP | 2011153446 | A | 8/1999 |
| JP | 2002328035 | A | 11/2002 |
| JP | 2004317160 | A | 11/2004 |
| KR | 19970071404 | B1 | 11/1997 |
| KR | 20040033141 | A | 4/2004 |
| KR | 20040050550 | A | 6/2004 |
| KR | 20040078955 | A | 9/2004 |
| KR | 20050035336 | A | 4/2005 |
| KR | 20050045716 | A | 5/2005 |
| KR | 20050105139 | A | 11/2005 |
| KR | 1020100072795 | A | 7/2010 |
| RU | 8141 | U1 | 10/1998 |
| WO | WO9800787 | A1 | 1/1998 |
| WO | WO2004044605 | A2 | 11/2005 |
| WO | WO2007040891 | A1 | 4/2007 |

OTHER PUBLICATIONS

Biegel et al., "A Framework for Developing Mobile," Context-Aware Applications, Proceedings of the Second IEEE Annual Conference on Pervasive Computing and Communications, 2004. Mar. 14-17, 2004, 5 pages.
Billinghurst et al., "An Evaluation of Wearable Information Spaces," Proceedings of the Virtual Reality Annual International Symposium, 1998, 8 pages.
Billinghurst, "Research Directions in Wearable Computing," University of Washington, May 1998, 48 pages.
Billinghurst et al., "Wearable Devices: New Ways to Manage Information," IEEE Computer Society, Jan. 1999, pp. 57-64.
Biskikian et al., "Intelligent Pervasive Middleware for Context-Based and Localized Telematics Services," 2002, 10 pages.
"Changes 10 Lists on Spaces with the Last Release", retrieved on Apr. 9, 2008 at <<http://thespacecraft.spaces.live.com/blog/cns!8AA773FEOA1289E3!36422.entry>>, 4 pages.
Chen et al., "A Survey of Context-Aware Mobile Computing Research," Dartmouth Computer Science Technical Report, 2000, 16 pages.
Coactive TV, retrieved on Mar. 28, 2011 at <<http://teleshuttle.com/CoTV/>>, 2 pages.
Harter et al., "A Distributed Location System for the Active Office," IEEE Network, 1994, pp. 62-70.
Horvitz et al., "Attention Sensitive Alerting," Proceedings of the UAI' 99 Conference on Uncertainty and ArtificialInteliigence, Jul. 1999, 10 pages.
Horvitz et al., "Attention-Sensitive Alerting in Computing Systems," Microsoft Research, Aug. 1999, 26 pages.
Horvitz et al, "Bayesphone: Context-Sensitive Policies for Inquiry and Action in Mobile Devices," Proceedings of the Tenth Conference on User Modeling (UM 2005). Jul. 2005, Edinburgh, Scotland, 11 pages.
Horvitz et al, "Coordinate: Probabilistic Forecasting of Presence and Availability," Eighteenth Conference on Uncertainty and Artificial InteliiQence, Jul. 2002, pp. 224-233.
Horvitz et al., "Display of Information for Time-Critical Decision Making," Proceedings of the Eleventh Conference on Uncertainty in Artificial Inteligence, Aug. 1995, 10 pages.
Horvitz et al., "In Pursuit of Effective Handsfree Decision Support: Coupling Bayesian Inference, Speech Understanding, and User Models," 1995, 8 pages.
Horvitz et al., "Learning and Reasoning about Interruption," Fifth International Conference on Multimodal Interfaces, Nov. 2003, 8 pages.
Joachims, "Text categorization with support vector machines: learning with many relevant features," Machine Learning, European Conference on Machine Learning, Apr. 21, 1998, pp. 137-142.
Kargl et al., "Smart Reminder—Personal Assistance in a Mobile Computing Environment," Pervasive 2002, Zurich, Switzerland, Aug. 26-28, 2002, 6 pages.
Machine translation of submitted KR Application: KR-2003-0070622 PUB KR20050035336, Oct. 10, 2003, 9 pages.
Machine translation of submitted KR Application: KR-2005-0096785 PUB KR20050105139, Oct. 14, 2005, 4 pages.
Losee, Jr., "Minimizing information overload: the ranking of electronic messages," Journal of Information Science 15, Elsevier Science Publishers BV, 1989, pp. 179-189.
Nagra's cross-device user experience wins, "Advanced User Interface," Award at TV 3.0 conference, retrieved on Mar. 28, 2011 at <<ttp://www.advanced-television.tv/index.php/2010/12/21/nagra%E2%80%99s-cross-device-user-experience-wins-%E2%80%9Cadvanced-user-interface%E2%80%9D-award-at-tv-3-0-conference/>>, 4 pages.
International Search Report dated Sep. 29, 2003 for PCT Application Serial No. 00/20685, 3 Pages.
International Search Report and Written Opinion for PCT/US20071014405 mailed Dec. 11, 2007, 6 pages.
Publicis & Yahoo Team for Cross-Carrier Marketing, retrieved Mar. 28, 2011 at <<http://www.mobilemarketingwatch.com/tag/cross-device-marketing/>>, 4 pages.
Rhodes, "Remembrance Agent: A continuously running automated information retrieval system," Proceedings of the First International Conference on the Practical Application of Intelligent Agents and Multi Agent Technology, 1996, pp. 487-495.
Rhodes, "The Wearable Remembrance Agent: A System for Augmented Theory," The Proceedings of the First International Symposium on Wearable Computers, Oct. 1997, pp. 123-128.
Rhodes, "The Wearable Remembrance Agent: A System for Augmented Memory," Personal Technologies Journal Special Issue on Wearable Computing, 1997, 12 pages.
Schilit et al., "Context-Aware Computing Applications," In Proceedings of the Workshop on Mobile Computing Systems and Applications, Dec. 1994, pp. 85-90.
Schilit et al., "Customizing Mobile Applications," Proceedings USENIX Symposium on Mobile and Location Independent Computing, Aug. 1993, 9 pages.

(56) References Cited

OTHER PUBLICATIONS

Schilit et al., "Disseminating Active Map Information to Mobile Hosts," IEEE Network, 1994, vol. 8—No. 5, pp. 1-23.
Schilit et al., "The ParcTab Mobile Computing System," IEEE WWOS-IV, 1993, 4 pages.
Schilt, "A System Architecture for Context-Aware Mobile Computing," Columbia University, 1995, 153 pages.
Spreitzer et al., "Architectural Considerations for Scalable, Secure, Mobile Computing with Location Information," In the 14th International Conference on Distributed Computing Systems, Jun. 1994, pp. 29-38.
Spreitzer et al., "Providing Location Information in a Ubiquitous Computing Environment," SIGOPS '93, 1993, pp. 270-283.
Spreitzer et al., "Scalable, Secure, Mobile Computing with Location Information," Communications of the ACM, Jul. 1993, vol. 36—No. 7, 1 page.
Starner, "Wearable Computing and Contextual Awareness," Massachusetts Institute of Technology, Jun. 1999, 248 pages.
Theimer et al., "Operating System Issues for PDAs," In Fourth Workshop on Workstation Operating Systems, 1993, 7 pages.
Want, "Active Badges and Personal Interactive Computing Objects," IEEE Transactions on Consumer Electronics, 1992, vol. 38—No. 1, 11 pages.
Want et al., "The Active Badge Location System," ACM Transactions on Information Systems, Jan. 1992, vol. 10—No. 1, pp. 91-102.
Weiser, "Some Computer Science Issues in Ubiquitous Computing," Communications of the ACM, Jul. 1993, vol. 36—No. 7, pp. 75-84.
Weiser, "The Computer for the 21st Century," Scientific American, Sep. 1991, 8 pages.
Workshop on Wearable Computing Systems, Aug. 19-21, 1996, 3 pages.
Brilingaite et al., "Online Route Prediction for Automotive Applications," retrieved at <<http://www.cs.aau.dk/~csj/Papers/Files/2006_brilingaiteITSS.pdf>> Last accessed May 14, 2008, 9 pages.
Extended European Search Report for EP 07796299.1 mailed Oct. 12, 2011, 7 pages.
Froehlich et al., "Route Prediction from Trip Observations," in Society of Automotive Engineers (SAE) World Congress, 2008, Paper 2008-01-01 95, Detroit, Michigan, USA, 13 pages.
Karbassi et al., "Vehicle Route Prediction and Time of Arrival Estimation Techniques for Improved Transportation System Management," In Intelligent Vehicle Symposium, 2003, pp. 511-516.
Krumm et al., "Map matching with Travel Time Constraints," in Society of Automative Engineers (SAE) 2007 World Congress, 2007, Paper 2007-01-1 012, Detroit, Michigan, USA, 11 pages.
Krumm et al., "Predestination Inferring Destinations from Partial Trajectories," In Eighth International Conference on Ubiquitous Computing, (UBIComp 2006), 2006, Orange County, California, USA pp. 241-260.
Krumm, "Real Time Destination Prediction Based on Efficient Routes," SAE 2006 Transactions Journal of Passenger Cars—Electronic and Electrical Systems, 2006. 6 pages.
Laasonen, "Route Prediction from Cellular Data," retrieved at <<http://www.cs.helsinki.fi/group/context/pubs/caps05.pdf>> Last accessed May 14, 2008, 10 pages.
Lamb et al., "Avoiding Explicit Map-Matching in Vehicle Location," retrieved at <<http://users.rsise.anu.edu.au/~thiebaux/papers/its99.doc>> Last accessed May 14, 2008, 9 pages.
Office Action for U.S. Appl. No. 12/170,068, mailed on Nov. 29, 2011, John Krumm, "Route Prediction," 7 pages.
Patterson et al., "Inferring High-Level Behavior from Low-Level Sensors," In UbiComp 2003: Ubiquitous Computing, 2003, Springer, Seattle Washington USA, pp. 73-89.
Simmons et al., "Learning to Predict Driver Route and Destination Intent," In 2006 IEEE Intelligent Transportation Systems Conference, 2006, Toronto, Canada, pp. 127-132.
Bhawalkar et al., "ScheduleNanny Using GPS to Learn the User's Significant Locations, Travel Times and Schedule," retrieved at <<http://arxiv.org/ftp/cs/papers/0409/0409003.pdf>>, Sep. 2, 2004, 7 pages.
Horvitz et al., "Mobile Opportunistic Planning: Methods and Models," Proceedings of the Eleventh Conference on User Modeling (UM 2005), Jun. 2007, Corfu, Greece, pp. 238-247.
Kamar et al., "Mobile Opportunistic Commerce: Mechanisms, Architecture, and Application," Proceedings of AAMAS 2008, Estoril, Portugal, May 2008, 2 pages.
Kostove et al., "Travel Destination Prediction Using Frequent Crossing Pattern from Driving History," Proceedings of the 8th International IEEE Conference on Intelligent Transportation Systems, Vienna, Austria, Sep. 13-16, 2005, 8 pages.
Krumm et al., "Predestination: Inferring Destinations from Partial Trajectories," UbiComp 2006: Eighth International Conference on Ubiquitous Computing, Sep. 2006, 1 page.
Letchner et al., "Trip Router with Individualized Preferences (TRIP): Incorporating Personalization into Route Planning," Eighteenth Conference on Innovative Applications of Artificial Intelligence, Jul. 2006, 6 pages.
Mapquest.com Features, retrieved on Oct. 27, 2010 at <<http://features.mapquest.com/>> 3 pages.
Persad-Maharaj et al., "Real-Time Travel Path Prediction Using GPS-Enabled Mobile Phones," Presented at the 15th World Congress on Intelligent Transportation Systems, New York, New York, Nov. 16-20, 2008. Paper # 30413, 12 pages.
Torkkola et al., "Traffic Advisories Based on Route Prediction," retrieved at <<http://citeseerx.ist.psu.edu/viewdoc/download?doi=10.1.1.164.8542&rep=rep1&type=pdf>>, Sep. 2007, 4 pages.
Brush et al., U.S. Appl. No. 12/970,974, "Mobile Search Based on Predicted Location," filed Dec. 17, 2010, 35 pages.
Beard et al., "Estimating Positions and Paths of Moving Objects," Seventh International Workshop on Temporal Representation and Reasoning (Time 2000), Jul. 2000, 8 pages.
Choi et al., "Performance Evaluation of Traffic Control Based on Geographical Information," IEEE International Conference on Intelligent Computing and Intelligent Systems (ICIS2009), Dec. 2009, pp. 85-89.
"Configuring Multiple SSIDs," Cisco IOS Software Configuration Guide for Cisco Aironet Access Points 12.3(7)JA, retrieved from <<http://www.cisco.com/en/US/docs/wireless/access_point/12.3_7_JA/configuration/guide/s37ssid.html>> on Nov. 4, 2011, 5 pages.
Console et al, "Adaptation and Personalization on Board Cars: A Framework and Its Application to Tourist Services," Adaptive Hypermedia and Adaptive Web-Based Systems, Lecture Notes in Computer Science, vol. 2347-2006, Springer-Verlag Berlin, Heidelberg, May 2002, pp. 112-121.
Falaki, "WLAN Interface Management on Mobile Devices," University of Waterloo, Waterloo, Ontario, Canada, 2008, 88 pages.
International Search Report dated Jan. 15, 2007 for PCT Application Serial No. PCT/US2006/034608, 3 pages.
Translation of JP Office Action mailed May 31, 2011 for JP Patent Appln 2008-533377, 6 pages.
Krumm et al., "Predestination: Where Do You Want to Go Today?" Computer, vol. 40, Issue 4, Apr. 2007, pp. 105-107.
Krumm, "Where Will They Turn: Predicting Turn Proportions at Intersections," Personal and Ubiquitous Computing (2010), 14:7, Oct. 2010, 13 pages.
Lee, et al., "Design and implementation of a movement history analysis framework for the taxi telematics system," Proceedings of the 14th Asia-Pacific Conference on Communications (APCC2008), Oct. 2008, 4 pages.
Liu et al, "Location Awareness Through Trajectory Prediction," Department of Information Science and Telecommunications, University of Pittsburgh, Pittsburgh, Pennsylvania, May 2006, pp. 1-38.
Liu et al., "Remaining Delivery Time Estimation based Routing for Intermittently Connected Mobile Networks," 28th International Conference on Distributed Computing Systems Workshops, Jun. 2008, pp. 222-227.
Miyashita et al., "A Map Matching Algorithm for Car Navigation Systems that Predict User Destination," Advanced Information Networking and Applications (AINAW) Workshops 2008, Mar. 2008, 7 pages.
Office action for U.S. Appl. No. 12/170,068, mailed on Aug. 2, 2012, Krumm, "Route Prediction," 8 pages.

(56) References Cited

OTHER PUBLICATIONS

Orebaugh et al, "Wireless Sniffing with Wireshark," Wireshark & Ethereal Network Protocol Analyzer Toolkit, Chapter 6, Sep. 2006, pp. 6:1-6:104.

Sananmongkhonchai, et al., "Cell-based Traffic Estimation form Mutliple GPS-Equipped Cars," IEEE Region 10 Conference, TENCONN 2009, Jan. 2009, 6 pages.

"Smart WiFi for Android," S4BB Limited, retrieved on Nov. 4, 2011 from <<http://www.s4bb.com/software/smartwifi/smartwifi-for-android/>>, 5 pages.

Benzoon, "SmartWiFi for BlackBerry: A Battery Power Optimizer," retrieved on Nov. 4, 2011 at <<http://www.blackberryinsight.com/2011/06/03/smartwifi-for-blackberry-a-battery-power-optimizer/>>, Jun. 3, 2011, 10 pages.

Tanaka et al, "A Destination Predication Method Using Driving Contents and Trajectory for Car Navigation Systems," SAC'09, Mar. 2009, pp. 190-195.

Terada et al., "Design of a Car Navigation System that Predicts User Destination," Proceedings of the 7th International Conference on Mobile Data Management (MDM'06), May 2006, 6 pages.

van Setten et al, "Context-Aware Recommendations in the Mobile Tourist Application COMPASS," AH 2004, Eindhoven, The Netherlands, LNCS 3137, Springer-Verlag, Aug. 2004, pp. 235-244.

Vaughan-Nichols, "Will Mobile Computing's Future be Location, Location, Location?" Computer, vol. 42, Issue 2, Feb. 2009, pp. 14-17.

Wei et al., "Development of Freeway Travel Time Forecasting Models by Integrating Different Sources of Traffic Data," IEEE Transactions on Vechicular Technology, vol. 56, No. 6, Nov. 2007, pp. 368-369.

Wu et al., "A Dynamic Navigation Scheme for Vehicular Ad Hoc Networks," Latest Trends on Communications, Aug. 2010, pp. 85-90.

Xie et al., "Development of Navigation System for Autonomous Vehicle to Meet the DARPA Urban Grand Challenge," Proceedings of the IEEE Intelligent Transportation Systems Conference, Sep. / Oct. 2007, pp. 767-772.

Ye et al., "Predict Personal Contiuous Route," Proceedings of the 11th International IEEE Conference on Intelligent Transportation Systems, Oct. 2008, pp. 587-592.

ISA Korea, International Search Report and Written Opinion of PCT/US2012/043413, Korean Intellectual Property Office, Nov. 28, 2012, 8 pages.

European Patent Office, Extended European Search Report Issued in European Patent Application No. 12803616.7, Nov. 20, 2014, 6 Pages.

McGinty, Lorraine et al., "Personalised Route Planning: A Case-Based Approach", Advances in Case-Based Reasoning; Springer Berlin Heidelberg, Sep. 2000, pp. 431-443.

McGinty, Lorraine et al., "Shared Experiences in Personalized Route Planning", FLAIRS Conference 2002, May 2002, pp. 111-115.

* cited by examiner

SUGGESTIVE MAPPING

BACKGROUND

Generally, navigation devices present maps from a user's current location or a user-selected starting point to a user-selected destination. For example, with most navigation devices, such as mobile Global Positioning System (GPS) devices, a user may input a starting point and a destination in order to receive a map. Additionally, a user may input a destination and the device may prepare a map from the user's current location to the entered destination. However, in most cases, a user must either input a destination manually or by providing a voice command. However, requiring user input, current navigation devices may be unsafe, or even unlawful, to operate while driving.

Additionally, navigation devices may be most useful when a user is running late or does not know the address of the destination. For example, a user who is running late to a meeting, whether or not they know the meeting location, may not have time to look up the address or enter the address into their navigation device. Unfortunately, current navigation devices are inadequately equipped to handle these and other navigation device deficiencies.

BRIEF SUMMARY

This summary is provided to introduce simplified concepts for suggestive mapping devices, which are further described below in the Detailed Description. This summary is not intended to identify essential features of the claimed subject matter, nor is it intended for use in determining the scope of the claimed subject matter. Generally, the suggestive mapping devices and services described herein involve using a mobile device to provide suggestions regarding a user's destination based on historical location data, current location data, and/or communication inputs to and/or from the user's device.

In one embodiment, a suggestive mapping device may store historical data, including historical and/or current location data, historical and/or current location data of friends and/or contacts of the user, and/or contextual data such as the time of day and/or the day of the week, and determine a travel vector of the user. The device may then predict a destination of the user based on some combination of the historical location data and the travel vector and prepare for display a suggested map depicting the route to the predicted destination. In some aspects, the device may display all or part of the suggested map as well. Additionally, in some aspects, the device may send a suggested map to a user's mobile device for display, for example when the device is a Web server of a Web based system or of an in-cloud system. The device may also prepare different maps for display, each with a different number of travel instructions, and may display or send for display a respective map that corresponds to an appropriate travel vector of the user. Further, in some aspects, the device may prepare or display alternative suggested maps in response to an indication, such as selection of a "more suggestions" button, shaking of the device, nodding of the user, denying the current suggestion by asking for more suggestions, or the like.

In another embodiment, a suggestive mapping device may store historical location data of a user, determine a travel vector of the user, predict a destination of the user based on some combination of the historical location data and the travel vector, and prepare a map depicting one or more travel instructions to the predicted destination. In some aspects, the device may present a different number of travel instructions to the user based at least in part on a portion of the travel vector. For example, the device may be configured to prepare or present an increasing number of travel instructions at one time to the user as the user's speed increases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
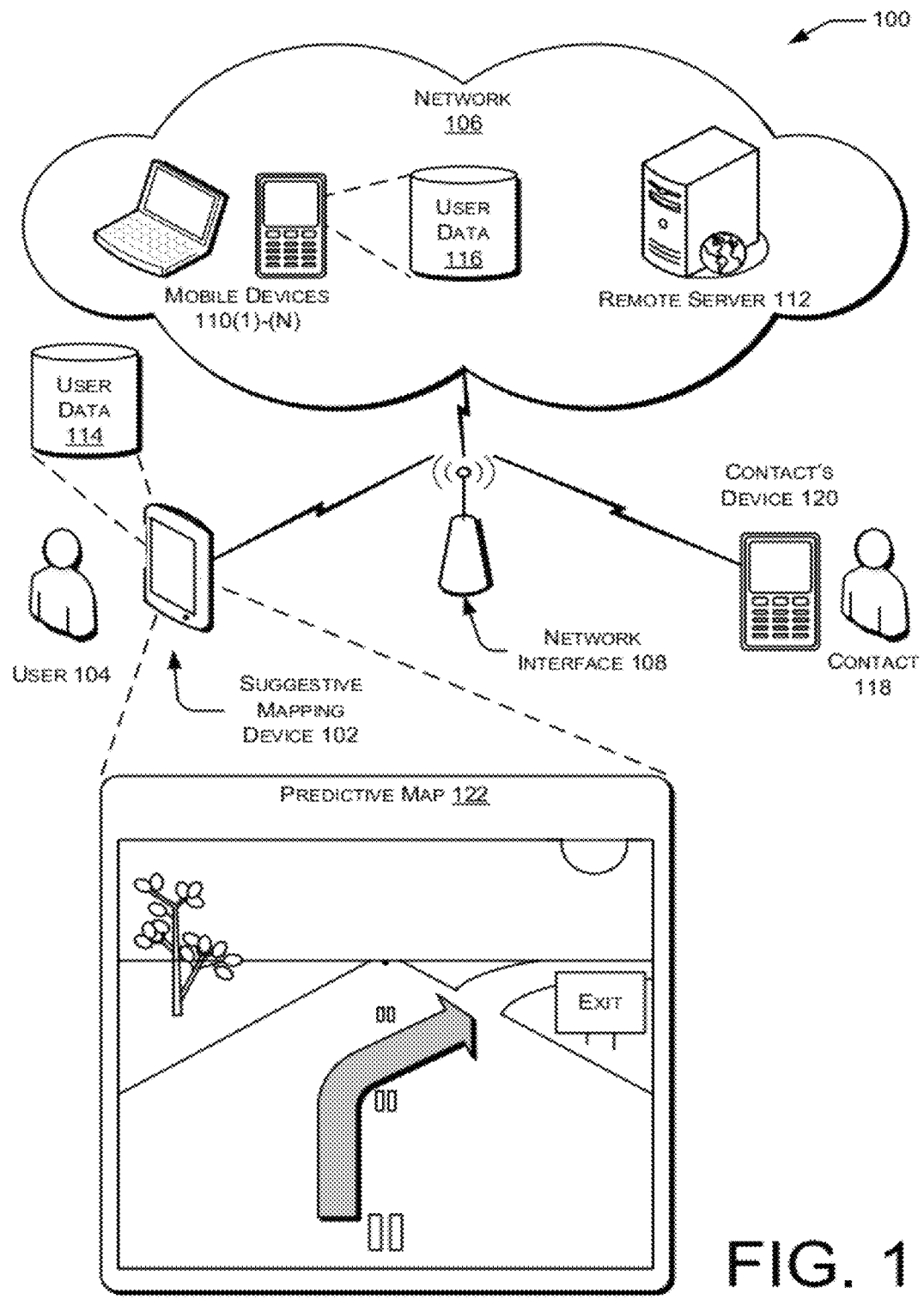
FIG. 1 is a schematic diagram of an illustrative architecture for implementing a suggestive mapping device.

This disclosure is directed, in part, to techniques for implementing a suggestive mapping device or service. This disclosure is also related to providing a hands-free, network interfaced device that may predict, and either provide or display a destination of a user based on historical location data of the user, contextual data of the user and/or historical and/or contextual data of the user's contacts. Additionally, this disclosure describes devices that may suggest a destination or multiple destinations to a user with or without user input. As such, the device may provide transient/ambient mapping such that the device may perpetually update the user with the next travel instruction(s) regardless of whether the user has input a destination or even knows the address of the destination. In this way, when a user is running late, cannot remember a destination's address, and/or is directionally challenged, the device may help the user effectively, effortlessly, and safely arrive at the intended destination.

In one aspect, a suggestive mapping device may predict one or more locations of where a particular user plans to go and present, to the user, a suggested map and/or directions of how to get to the predicted location(s). For instance, the suggestive mapping device may store historical location data of the user (at the consent of the user) to develop a pattern regarding a user's typical travel schedule. The device may then use this historical location data coupled with real-time or contextual data (e.g., locations of contacts, a time of day, or a user's travel vector which may include some combination of the current location, travel direction, and velocity of the user) and other signals (e.g., future calendar appointments of the user or contacts of the user) to predict where the user may go at a particular time. In response to this prediction, the device may prepare and/or render a suggested map to the user or provide the suggested map to a mobile device of the user. Further, in some examples, the suggestive mapping device may automatically assign friendly names (e.g., "Home," "Restaurant to meet Bill," "Pick up Dry Cleaning," etc.) to the predicted destinations and/or the suggested maps. These friendly names may be assigned based on context (e.g., a subject and/or an attendee name for a meeting request), based on a name associated with the destination location in a reference data store (e.g., a point of interest database), based on names other users have associated with the destination location, a combination of these or other approaches, or additional/alternative approaches. Names employed as tags may be confirmed in a current or prior session with the user, where a user is offered the option of selecting from or modifying guessed names, or adding a new label to refer to a destination.

For instance, a suggestive mapping device may help a user navigate on a given day to one or more locations without the user providing any inputs. In one hypothetical example, a user ("Risa") often goes for a walk around Riverfront Park on Saturday mornings, as tracked by her mobile navigation device. Additionally, Risa's calendar indicates that she is planning on meeting her sister Tali for lunch at a South Hill restaurant where Risa has never eaten. In this example, Risa's suggestive mapping device may automatically, at least without being requested by Risa, determine the most optimal route to the park and then to the restaurant to meet Tali, taking into account traffic, the time of day, potential construction, weather, and the like.

In one aspect, the suggestive mapping device may render a suggested travel map and/or directions to the park and then to the restaurant as soon as Risa turns, unlocks, or otherwise activates the device. Alternatively, or in addition, the suggestive mapping device may not render any maps to Risa until she begins travelling towards one of her destinations. Thus, either way, the device may provide the suggested map and/or directions without Risa's input (and/or with Risa's input limited to selection information wherein Risa selects a destination from a collection of suggested destinations). This may be particularly useful when Risa is not at home and the directions to the park may be different from her usual Saturday morning route. Additionally, if Risa does not know the address or location of the South Hill restaurant, the suggestive mapping device may be able to determine the location based on an Internet search using information found in Risa's calendar appointment or based on real-time contextual data such as Tali's location, as tracked by Tali's mobile phone or navigation device (assuming Tali consents to her location being tracked). Additionally, in some aspects, the suggestive mapping device may also use other contextual data of Tali's, such as data from her email applications, search and/or browsing histories from her Web browser(s), call histories from her cell phone, and the like.

In another aspect, the suggestive mapping device may take into account other signals when predicting a user's travel schedule and generating a corresponding map and/or directions. For example, the device may leverage an explicit and/or ad hoc social network to determine locations of the user's contacts, or any other information that may be pertinent in predicting where the user may travel to at a particular time. For instance, if Risa's mother ("Toni") calls, texts, instant messages ("IMs"), tweets to the public, or otherwise digitally contacts Risa while Risa is traveling to either location described above, the suggestive mapping device may appropriately change. In this example, Toni's cellular telephone, navigation device, or other mobile device may indicate that Toni is only a few blocks from the park, the South Hill restaurant, or Risa's current location. As such, Risa's suggestive mapping device may re-render the suggested map to include stopping by to see Toni at some point during Risa's Saturday travels. In other words, the travel prediction and the corresponding predictive map and/or directions may change based on real-time inputs.

In another aspect, the suggestive mapping device may have access to information about the short- or long-term goals and needs of Risa, and may suggest other waypoints on a current trip, with the bounds of the waypoint adding less than some number of miles or some amount of time to getting to the predicted destination. For example, the suggestive mapping device may have access to knowledge from an interface to an onboard computer that Risa's car is low on fuel and to add a fueling station as a suggested point to route through on the way to Tali. Likewise, the suggestive mapping device may have knowledge about Risa's lunch-time food preferences based on a consideration of the stops that Risa has made for approximately 1-2 hour periods of time around the noon hour during the week, via a reverse look up and mapping of the stops to a database of shops and the details of what they sell. A database of menus at restaurants associated with Risa's stops, along with ratings of the quality of food, décor, and service might be stored by a mobile device and/or cloud service, and used to generate recommendations about places to eat lunch near a destination or along the way to a destination. Such information and possibility for making suggestions based on routes might be added to an advertising service, with bidding for alerts and electronic coupons as incentives.

Additionally, in another aspect, the suggestive mapping device may predict multiple suggested locations. Further, the device may compute an ordering of the multiple suggested locations based, in some examples, on an estimation of the probability of the desirability or helpfulness of the suggested locations. The ordered list may then be provided in a rank-ordered list, or revealed in a sequence by likelihood when a user asserts interest in seeing the next location. In two non-limiting examples, the suggested locations may be utilized as alternative destinations or as waypoints to a current destination or can be made during the time that directions are being explicitly searched for, either on mobile devices or on a desktop system. Additionally, suggested locations can be within some distance or time to other destinations, e.g., named destinations or predicted destinations.

FIG. 1 depicts an illustrative example architecture 100 for implementing a suggestive mapping device 102 as briefly described above. A user 104 may interact with the suggestive mapping device 102 to aid in navigation while driving, walking, or otherwise traveling from one location to the next. By way of example only, the suggestive mapping device 102 may be a cellular telephone, handheld GPS device, tablet, laptop, desktop computer, or any other computing device that may perform suggestive mapping. In one example, the suggestive mapping device 102 may be a handheld GPS device that may connect to a network 106 through network interface 108.

Network interface 108 may be any type of device or transmission tower that may provide network access to network accessible devices, such as the suggestive mapping device 102. Additionally, other network accessible devices, such as other mobile devices 110(1) through 110(N), where N is an integer greater than zero, and remote server 112 may interact with the suggestive mapping device 102 via the network 106. In at least one instance, other remote devices (collectively 110) may be devices operated by the user 104. For example, suggestive mapping device 102 may be the user's GPS device, while other mobile devices 110(1) and 110(2) may be a laptop computer and a cellular telephone of the user 104, respectively. In this way, the devices 102 and/or 110 of the user 104 may share location, calendar, and other historical and/or contextual data about the user 104 amongst each other.

Additionally, by way of example only, the suggestive mapping device 102 may store such location, calendar, historical and/or contextual data in user data store 114. In one example, the user data store 114 may reside within the suggestive mapping device 102. However, in other examples, the user data store 114 may reside within one or more of the other mobile devices 110 or even the remote server 112 (e.g., implemented as an in-cloud service). Alternatively, or in addition, separate user data stores, such as user store 116 may reside individually in each device. In other words, user data store 114 may reside within the suggestive mapping device 102, while user data store 116 resides within one of the other mobile devices 110 of the user 104, such as mobile device 110(2). In this example, a different user data store may reside within the remote server 112.

In one non-limiting example, user 104 may regularly be at home after 6:30 pm on weeknights. In this example, this location data may be stored in the user data store 114 of the user's handheld GPS device 102, in the user data store 116 of the user's cellular phone 110(2), in the remote server 112, or in any combination of these locations. Further, if the user 104 is out to dinner late one evening (i.e., after 6:30 pm), the user's suggestive mapping device 102 or cellular phone 110(2) may provide a suggestive map, such as predictive map 122, with directions to the user's home. In this way, the user 104 need not provide input to the suggestive mapping device 102. Alternatively, based on the earlier example, user data store 114, user data store 116, and/or remote server 112 may store location data about Risa's Saturday morning habits. This data may then be used to aid in preparing a predictive map 122 for Risa. As used herein, the phrases "predictive map" and "suggestive map" are synonymous.

In some instances, a contact 118 of the user 104 may operate contact's device 120, which may access the network 106, or some other network, via network interface 108 as well. For example, user's contact 118 may be able to call, text, IM, email, or otherwise contact the user 104 over the network 106, or some other network, via network interface 108. Additionally, with the consent of contact 118, the suggestive mapping device 102 of user 104 may access the location data of contact 118 identified by contact's device 120. Thus, the predictive map 122 provided to user 104 may, in some instances, be based at least in part on the location of contact 118. User data stores 114 and/or 116, and remote server 112, may also store user application data, such as information gathered from a user's calendar, email, text-messaging, IM, voicemail, or other application that may contain contextual and/or historical location data.

In one example, where the suggestive mapping device 102 and/or the contact's device 120 shares user and/or application data, the suggestive mapping architecture 100 may provide opt-in and/or opt-out functionality. Additionally, in one instance, prior to any user information being collected and/or shared amongst the devices, the user whose information is to be collected will be notified and given the ability to opt-out prior to any data collection. Further, in one aspect, enhanced security measures will be employed in order to protect the user and/or application data.

In one aspect, the suggestive mapping device 102 may also provide suggestions for particular tasks based on the user information stored in user data stores 114 and/or 116, or remote server 112. For example, the suggestive mapping device 102, while providing a map to a user's school, may also remind the user to drop off his or her dry-cleaning on the way. Additionally, the suggestive mapping device 102 may also re-route the user 104 to the dry-cleaners on the way to or from school. In one example, if the user 104 is running late to school, and the suggestive mapping device 102 has stored in user data 114 the historical times that the user 104 attends school, the suggestive mapping device 102 may suggest dropping off the dry-cleaning and provide the re-routed map after the user 104 attends classes. Alternatively, in one example, the suggestive mapping device 102 may be able to determine the route time to the dry-cleaners, the total additional time required to get to the dry-cleaners on the way to school, and/or how much time remains between the current time and the historical start time of school, and provide a predictive map 122 that directs the user 104 to the dry-cleaners on the way to school such that the user 104 will still make it to class on time.

Additionally, in one aspect, the suggestive mapping device 102 may provide a predictive map 122, with a suggested destination or task, "x" minutes before the predicted arrival to that destination. Additionally, "x" may be some time "y" plus the total route time to get to the destination. Further, the user 104 may be able to set "y" on the fly or prior to receiving the predictive map 122. As such, using the dry-cleaning example, the user 104 may set a "y" of 15 minutes, meaning that it takes approximately 15 minutes to park, take the clothes in, pay, and get out of the parking lot at the dry-cleaners. In this way, if "y" equals 15 minutes and the user 104 has 30 minutes until school starts, the suggestive mapping device 102 may only re-route and/or suggest a map to the dry-cleaners when the route to the dry-cleaners and then to school is estimated to be under 15 minutes. Alternatively, or in addition, "y" could be pre-set or could be suggested by the dry-cleaner and stored in the remote server 112 for all dry-cleaner customers.

In some instances, the suggestive mapping device 102 may be configured to predict a different route based at least in part on an intentional change of direction of a user 104 and/or other inputs to the device 102, one of the other mobile devices 110, and/or the remote server 112. For example, using Risa's Saturday morning example from above, if while driving to the park, Risa receives a telephone call, or other network communication, from her father, Jesse, and subsequently changes directions, the suggestive mapping device may provide a re-routed predictive map 122 based on Jesse's current location. In this example, the suggestive mapping device 102 may suggest that Risa's new destination is Jesse's current location, as provided by Jesse's mobile device or the remote server 112.

In one example, if this new predictive map 122 to Jesse's location is correct, Risa may do nothing (i.e., no user input to the device is needed); however, if the predictive map 122 is incorrect (e.g., she is not actually changing her direction to meet Jesse), Risa may request a new predictive map 122 (or the next predicted map). In some instances, Risa may request the new map by shaking, pushing a button of, selecting a GUI icon of, or speaking into the suggestive mapping device 102. However, other methods of requesting a new map are envisioned as well, including gesturing or otherwise motioning on or near a touch-screen of the suggestive mapping device 102.

Alternatively, rather than automatically providing the new predictive map 122 to Jesse's location, the suggestive mapping device 102 may provide several suggestions for a new destination and allow Risa to select the correct one. As noted above, selection of the correct map, or of a next predicted map in a list of potential predictive maps, may be implemented in many different ways. Additionally, the suggestive mapping device may also provide a list of possible destinations, each being predicted and potentially carrying a respective probability of correctness, when the device is first turned on, or at any time during operation, rather than only when a user changes direction. Further, in one aspect, shaking the device 102 while the device 102 is unlocked may trigger the device 102 to advance the displayed predictive map to a next predictive map 122 in a ranked list of predictive maps 122. Alternatively, if the device 102 is locked, shaking the device may trigger the display of the already displayed predictive map 122.

Further, in yet another non-limiting example, the suggestive mapping device 102 may render newly predicted destinations as a trip progresses. In this way, a user 104 may defer selecting from among predicted destinations until after a part of the trip is complete. For instance, the user 104 may drive in the general direction of his or her intended direction, with or without knowledge of the exact route. In this example, the suggestive mapping device 102 may be able to eliminate potential destinations and predict a more accurate (or more probable) destination by eliminating some destinations that may have otherwise been predicted.

FIG. 1 provides a simplified example of a suitable architecture 100 for implementing a suggestive mapping device or service according to the present disclosure. However, other configurations are also possible. For example, the suggestive mapping may be implemented almost entirely on the remote server 112, such that user devices may be thin-client devices configured to receive the predictive maps 122 from the remote server 112. Additionally, while predictive map 122 shows a single direction (e.g., the next direction is a right turn), any type of predictive map 122 may be provided. for example, predictive map 122 may provide a single travel instruction (as shown), several travel instructions, or an entire route including all or most of the travel instructions to a predicted or suggested destination.

Illustrative Architectures

Figure 2:
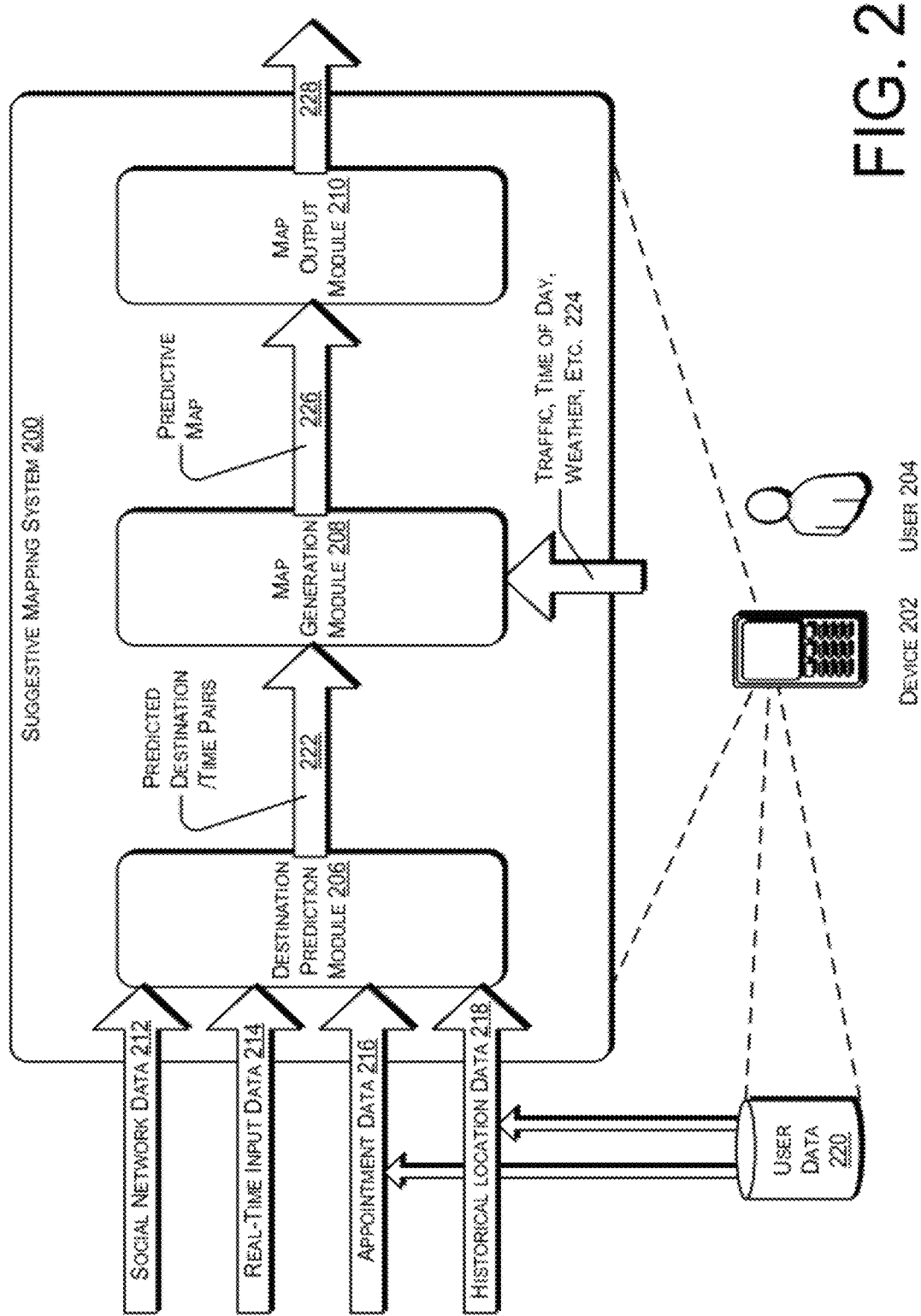
FIG. 2 is a schematic diagram illustrating details of an illustrative architecture for implementing a suggestive mapping system within a device.

FIG. 2 depicts an illustrative system 200 for implementing a suggestive mapping device 202 similar to device 102 of FIG. 1. While FIG. 2 describes the system 200 implemented within device 202; alternatively, as noted above, a remote server may implement system 200 as an in-cloud service. In one aspect, a user 204 may interact with the suggestive mapping device 202 to receive predictive maps for potential destinations. As such, the suggestive mapping device 202 may aid the user 204 in determining a best route to an intended destination. Additionally, the device 202 may further aid in the hands-free navigation to predicted destinations based on historical location data, social network data, appointment data, and/or real-time inputs. As noted above, in one aspect, the system 200 operates as an in-cloud service that can handle each of the features described below remotely.

In one aspect, the suggestive mapping system 200 may include a destination prediction module 206, a map generation module 208, and a map output module 210. Destination prediction module 206 may, in some examples, receive information regarding a travel vector and/or other location related information about user 204 or contacts of the user 204, and may predict a destination for user 204 based on this received information. For example, the destination prediction module 206 may receive social network data 212 from a social networking Web site, from a remote suggestive mapping server (e.g., from a cloud service), or directly from contacts of the user 204. As such, the system 200 may leverage an explicit and/or ad hoc social network to determine locations of the user's 204 contacts, or any other information that may be pertinent in predicting where the user may travel to at a particular time. Social network data 212 may include, but is not limited to, location data of friends or contacts of user 204 and/or appointments, events, or schedules organized or stored on a social networking Web site or other server. Additionally, in one aspect, social network data 212 may be stored in a shared database that may be accessed by the user 204 or other contacts and/or friends of the user 204.

Additionally, the destination prediction module 206 may also receive real-time input data 214. Real-time input data 214 may include a travel vector of the user 204, the current time, and/or the current location of the user 204. Additionally, in some instances, real-time input data 214 may include communications with friends or contacts of user 204, such as telephone calls (including voicemails), text messages, IMs, and the like. As such, the destination prediction module 206 may make predictions, or update predictions, about the intended destination of user 204 based on real-time communications that may influence the route of user 204.

Further, the prediction destination module 206 may receive appointment data 216 and/or historical location data 218 about user 204. As noted above, this information may be stored in memory such as user data store 220 of device 202 or it may be stored in a remote server. Either way, appointment data 216 may include location and/or time information from a calendar application of user 204 or contacts of user 204. As such, if user 204 has an appointment scheduled in a calendar application or other user application that organizes appointments, the destination prediction module 206 may predict the intended destination of the user 204 based on this information. In some instances, however, the communications received from and/or sent to a user's contacts (e.g., voicemails, text messages, etc.) and/or the calendar appointment data 216 may not include an actual address to which a route may be predicted. For example, the communication and/or appointment may simply list a place with a common name or other identifier (e.g., "Piano lesson at 2 p.m."). In this case, the prediction destination module 206, alone or in conjunction with another module of the suggestive mapping system 200, may automatically associate a location with the common name or other identifier by observing where the user normally goes at this time and/or by searching the Internet or other data of the user. As such, the suggestive mapping system 200 may use machine learning algorithms or other methods of training to learn locations of a user and provide a suggested map and/or route with or without an explicit address entered by a user or found in a communication or appointment.

Additionally, historical location data 218 may include previous locations that user 204 has visited and the associated dates and times of the visits. In one instance, a user's habits may directly affect the destination prediction module 206. For example, if user 204 is usually at work from 9 am to 5 pm, at the same location, and user 204 is traveling from his or her house at 8:30 am, the destination prediction module 206 may predict that user 204 is traveling to work. In one aspect, the destination prediction module 206 may make several predictions and rank each prediction based on probabilities. Additionally, these probabilities may be weighted by user-defined priorities or by a machine-learning algorithm that learns over time. Further, historical location data 218 may include a user's 204 recent queries or a history of queries to a search engine, both independent of location and/or by location as determined by GPS. Additionally, the historical location data 218 may be used to aid in the prediction of destinations and/or the labeling of the predictions.

In some aspects, historical location data 218 may be created by monitoring a user's 204 context based on traversing through locations and/or stopping and dwelling at locations, e.g., as an indication that a user is interacting with a service or people at a location. This data 218 may, in some instances, be leveraged in the generation of predicted locations during a current session or at future sessions. In some examples, stopping or dwelling can be observed through location signals (e.g., GPS, Wifi, etc.) or the periods of time that such signals are absent, e.g., based on the loss of signals associated with a device being turned off or being blocked from the signals associated with a structure being entered (e.g., a parking garage).

Additionally, in one aspect, the destination prediction module 206 may create predicted destination/time pairs 222. Predicted destination/time pairs 222 may include respective predicted destinations for each time of day. That is, the destination prediction module 206 may automatically predict destinations for each point in time of each respective day based on the historical location data of user 204. For example, based on historical location data, the destination prediction module 206 may predict that user 204 will be at home from 7 pm until Sam every weekday. In such an instance, the destination prediction module 206 may predict that user 204 will be at home during each period of time between 7 pm and Sam the next day (during weekdays). That is, the following predicted destination/time pairs 222 may exist: home/7 pm, home/8 pm, home/9 pm, and so on. Further, the destination prediction module 206 may supplement or otherwise alter the time pairs 222 based on social network data 212, real-time input data 214, appointment data 216, and/or other historical location data 218. By way of example only, with the time pairs 222 described above, if user 204 were traveling towards his or her home at 10 pm on a weekday, at least one predicted destination (and possibly the predicted destination with the highest probability of being correct) will be the home of user 204. Alternatively, regardless of the direction of travel of user 204, at 10 pm, the destination prediction module 206 may predict that user 204 is traveling home.

Additionally, in some aspects, the destination prediction module 206 may utilize real-time location information from friends or contacts of user 204 to predict destinations. Alternatively, or in addition, the destination prediction module 206 may be configured to operate in multiple different modes. For example, in one non-limiting mode, the destination prediction module 206 may be configured to predict a single destination prediction. In another non-limiting mode, however, the destination prediction module 206 may be configured to predict a list of destinations and then apply a ranking algorithm to order the list for consumption.

As noted above, the suggestive mapping system 200 may also include a map generation module 208. Map generation module 208 may receive the predicted destination/time pairs 222 from the destination prediction module 206. Additionally, map generation module 208 may also receive information 224 regarding traffic, time of day, weather, etc. from any source that may provide such information. In one aspect, information 224 may be included in real-time input data 214; however, in other aspects, it may be received separately as other real-time input data 214, such as from a traffic service, weather service, and/or GPS service provider. In one aspect, the map generation module 208 may produce maps for each predicted destination/time pair 222 created by the destination prediction module 206. In other aspects, however, the map generation module 208 may only prepare a map for the prediction with the highest probability, or a predetermined number of highest probabilities.

The suggestive mapping system 200 may also include a map output module 210. In one implementation, the map output module 210 may receive predictive maps 226 prepared by the map generation module 208. As noted above, in one aspect, the suggestive mapping system 200 may reside within device 202. In this example, the map output module 210 may prepare and render the predictive map 226. Alternatively, the map output module 210 may prepare and render multiple predictive maps 226. Either way, in this example, the rendering of the predictive map(s) 226 by the map output module 210 may include displaying the predictive map(s) 226 on a display device of device 202. Alternatively, in other aspects, the suggestive mapping system 200 may be implemented as an in-cloud service residing on a remote server. In this alternative aspect, the map output module 210 may transmit the predictive map(s) 226 to device 202 over a wired or wireless network.

Additionally, the suggestive mapping system 200 may also include an advertisement module. The advertising module may be configured to allow bidding for users based on their interests, history, and context. In some examples, the advertisements may be linked to the suggested locations that drive them. In some aspects, when there are two (or more) potentially valuable suggested locations, per user interests, trajectory, location, etc., the advertisement module may take bids or payments about which location to display, or the specifics of the sequence to display the suggestions to the user. Current traffic can be considered in the suggested locations, as well as in the bidding model above.

Further, in some aspects the suggestive mapping system 200 may suggest maps or directions based on information about sensed or shared information regarding the destinations of friends or contacts (e.g., as revealed via information in a social graph, buddy list, email header, texting activity, or phone activity) over time. For example, information that a close friend or colleague of Risa (e.g., as revealed by an analysis of the interaction of the friend with Risa by email—with frequency of x and recency of y), has frequented a restaurant that Risa may be passing, but (via detection of location trails) has never experienced, may be used in the formulation and ranking of a suggested map, location, and/or directions to a location.

Figure 3:
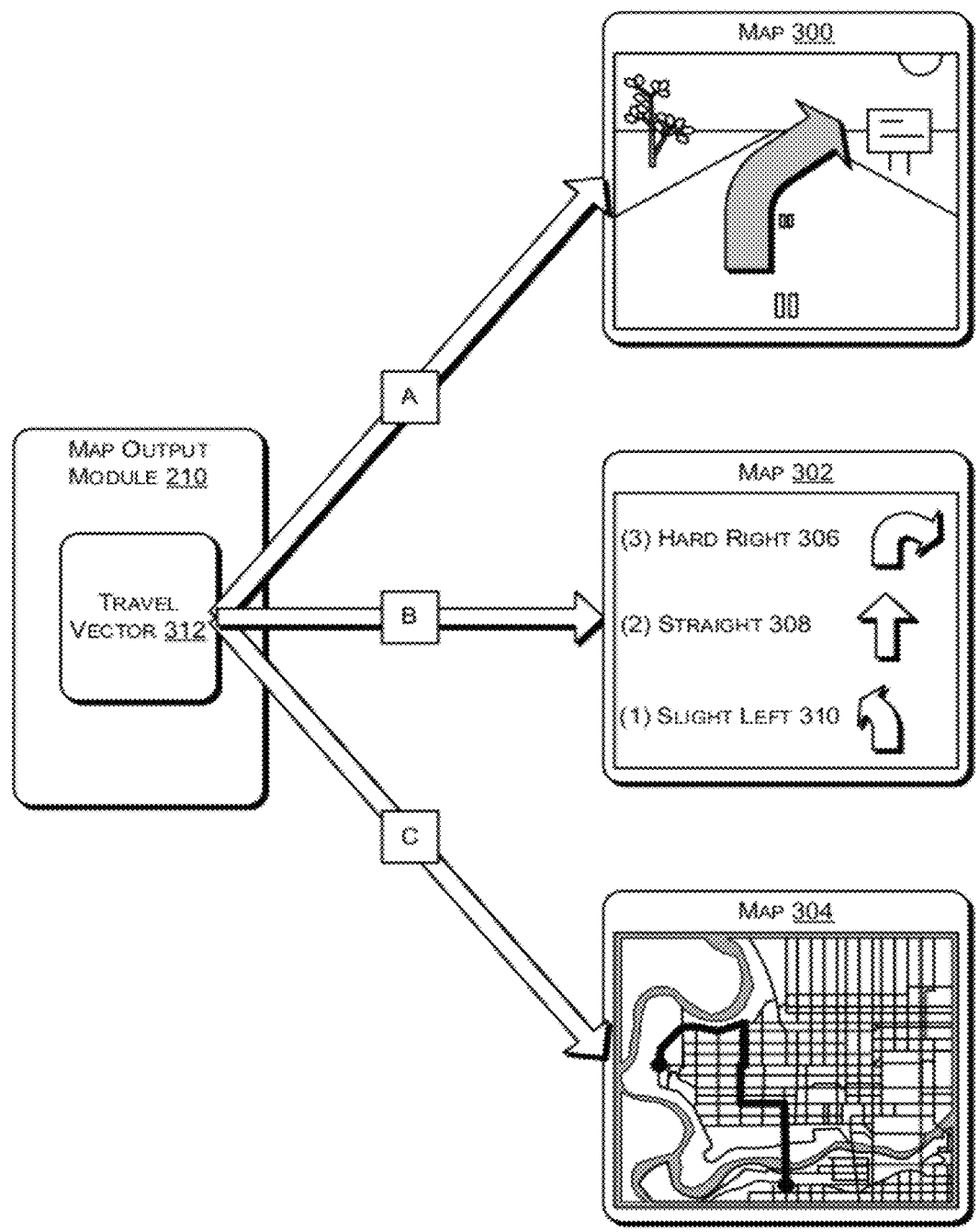
FIG. 3 is a schematic diagram illustrating further details of a map output module and potential suggested maps.

FIG. 3 depicts illustrative details of the map output module 210 of FIG. 2. The map output module 210 may provide any number of different types of maps to a user of a suggestive mapping device or service. In one aspect, the map output module 210 may prepare, transmit, or render three different maps. In particular, arrow A depicts a first map 300, arrow B depicts a second map 302, and arrow C depicts a third map 304. As can be seen by FIG. 3, each of maps 300, 302, and 304 depicts a different level of detail. For example, map 300 depicts the lowest detail in that only the next travel instruction is being displayed. Map 302 depicts a medium-level of detail in which several travel instructions are displayed. Finally, map 304 depicts the highest level of detail in that it shows the entire map.

More specifically, map 300 may display the next travel instruction. In this example, the next travel instruction is to exit the highway to the right, or simply turn right at the next road. This map may be most appropriate when driving a vehicle at a relatively slow speed. That is, the next travel instruction may be the only instruction that the driver is interested in due to the relatively long amount of time that may pass before needing the next instruction. On the other hand, map 302 may display the next few travel instructions. Here, the next few instructions are to (1) turn slight left 306, then (2) go straight 308, and then (3) make a hard right 310. Much like map 300, this map may be most appropriate at specific relative speeds. For example, map 302 may be more appropriate when driving or walking at a relatively faster speed than that described above for map 300. That is, the next few travel instructions may be more appropriate due to the relatively shorter amount of time between instructions. Finally, map 304 may be more appropriate at relatively fast speeds or when not moving. That is, when driving at highway speeds, seeing the entire map, or at least most of the instructions, may be more appropriate. Alternatively, or in addition, when not moving at all, a user may wish to see the entire route as well.

In one aspect, a travel vector 312 may include a user's velocity, current location, and current direction of travel. As such, the map output module 210 may determine which map 300, 302, or 304 to prepare, transmit, or display to a user based at least in part on the calculated travel vector of the user. In some examples, however, the user may be able to shuffle through, or otherwise select, the different maps to select a preferred map.

FIGS. 2 and 3 provide simplified examples of suitable architecture 200 and suggested maps 300, 302, and 304 for implementing a suggestive mapping device or service according to the present disclosure. However, other configurations are also possible. For example, the destination prediction module 206 may use other inputs not described with reference to FIG. 2. Additionally, the suggestive mapping system 200 may be configured with more or less modules than shown for implementing the features described. Further, while FIG. 3 shows three different types of suggested maps 300, 302, and 304, the map output module 210, or any other type of module, may prepare, transmit, or render any number of different suggested maps. Additionally, the suggestive mapping system 200 and/or the map output module 210 may provide other information about a predicted route (e.g., traffic conditions, detours, road conditions such as construction, ice, accidents, or other route information, etc.) to a user even if the route is a familiar one.

Illustrative Suggestive Mapping Processes

Figure 4:
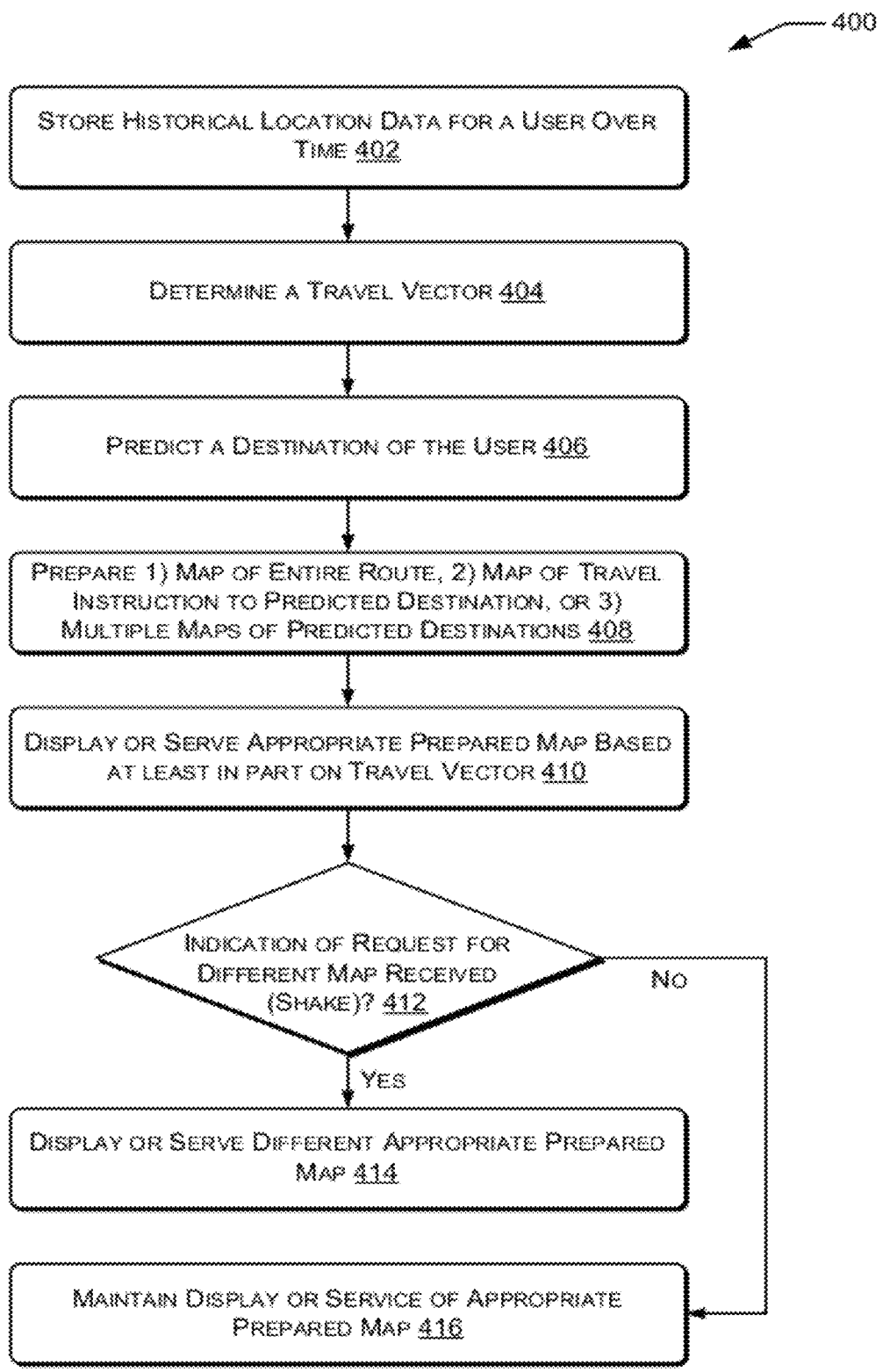
FIG. 4 is flowchart illustrating details of a method for implementing a suggestive mapping device or service.

FIG. 4 is a flow diagram of one illustrative process 400 for implementing a suggestive mapping device or service as described with reference to FIGS. 1-3. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates an example flow diagram of process 400 for implementing a suggestive mapping device or service that may be responsible for determining predictive maps and preparing, serving, or displaying the predictive maps, as discussed above. In one example, the illustrative, suggestive mapping device 102 of FIG. 1 may perform any or all of the operations of process 400.

In this particular implementation, the process 400 may begin at block 402 of FIG. 4 in which the process 400 may receive and/or store historical location data for a user over time. As discussed above, historical location data may include location/time pairs for places where a user has been, and the respective dates and times for when the user was there. At block 404, the process 400 may determine a travel vector. In one example, a travel vector may include a velocity, a current location, and a direction of travel for a particular user. Determining the travel vector may include receiving real-time inputs from a user device (with the user's consent) or determining the real-time data at the user device, such as a hand-held GPS device. In one example, the destination prediction module 206 described as part of device 202 of FIG. 2 may receive and/or store the historical location data and/or the real-time inputs.

At block 406, the process 400 may predict a destination of the user based at least in part on the historical location data and/or the travel vector. In one example, the prediction may be carried out by the destination prediction module 206 of FIG. Additionally, in one example, the travel vector may aid in the prediction, or at least aid in ranking the predictions. For example, if the process 400 predicts three destinations at block 406; however, the user is traveling in a direction that would take the user to the second of the three predicted destinations, the process 400 may rank the second destination highest. Alternatively, if the user does not have time to reach one of the three predicted destinations, that destination may be ranked the lowest.

At block 408, the process 400 may prepare an entire route to each predicted destination, one or more travel instructions to each predicted destination, and/or multiple predicted destinations that may be ranked for consumption. Alternatively, the process 400 may prepare an entire route and/or one or more travel instructions to the highest ranked predicted destination at block 408. In one example, the map generation module 208 described as part of device 202 of FIG. 2 may prepare the map(s). Further, at block 410, the process 400 may display or serve the appropriate prepared map based at least in part on the travel vector. That is, as discussed above, a map may be appropriate based on the velocity of the user. Thus, the travel vector may be used to determine which map to display. Additionally, in some instances, the appropriate map may be served to a user device from a remote server.

At decision block 412, the process 400 may determine whether an indication of a request for a different map has been received. In some instances, a user may shake the device, such as, for example, suggestive mapping device 102 of FIG. 1, to indicate a request for a different map. In other instances, however, a user may select a GUI item, press a physical button, or use a voice command to indicate a request for a different map. When an indication of a request for a different map is received (e.g., the user shakes the device), process 400 may display or server a different, yet appropriately scaled, map to the user device at block 414. In this way, process 400 may either display the next highest ranked map on the user device or serve it to the user device (e.g., in the cloud computing example). Alternatively, when an indication of a request for a different map is not received, process 400 may maintain the display of the appropriately scaled, map to the user device at block 416. In this way, process 400 may have predicted the actual destination of the user and a different map may not be helpful or requested.

Illustrative Computing Environment

Figure 5:
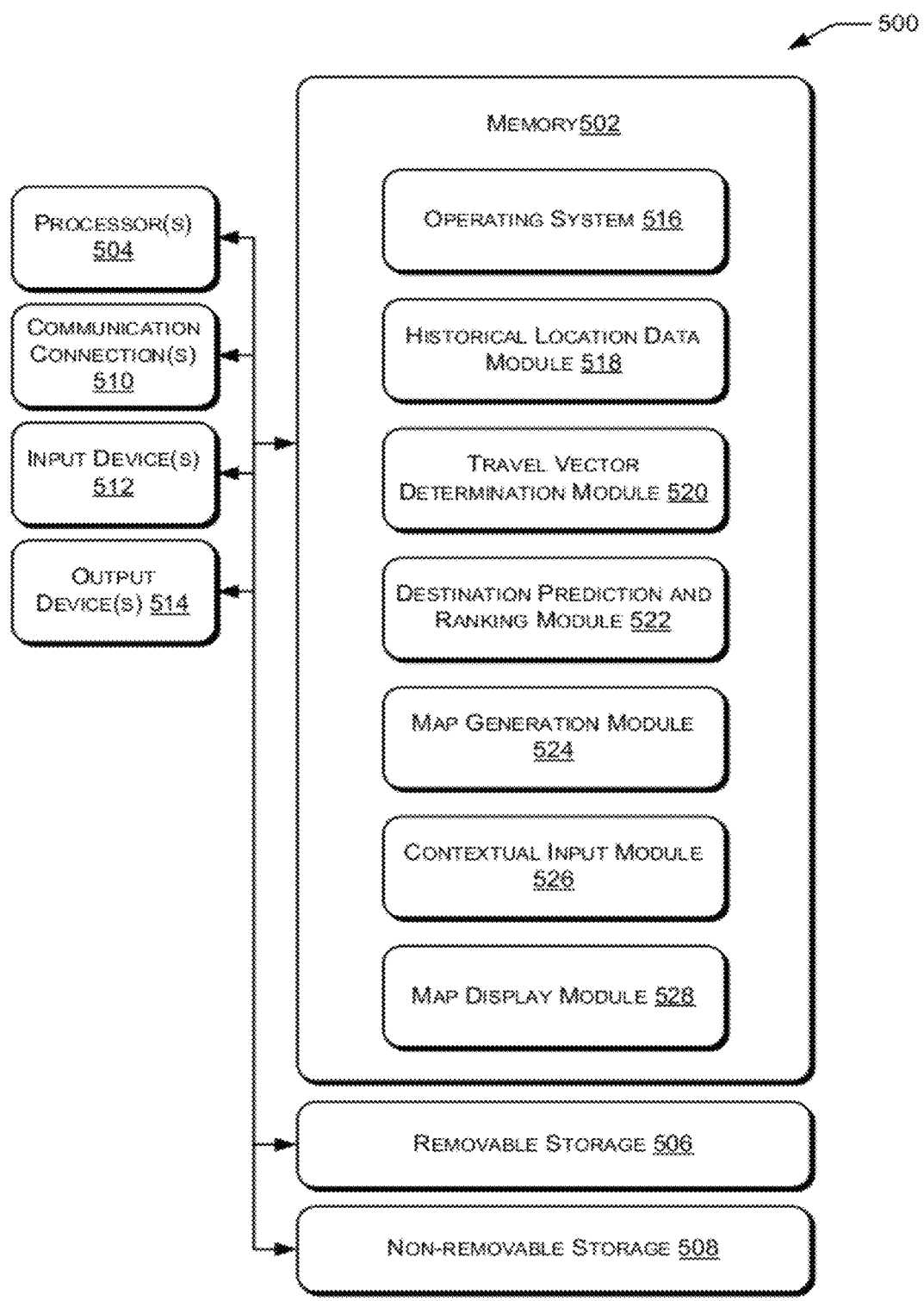
FIG. 5 is a block diagram of a computer environment showing an illustrative system with which a suggestive mapping device or service may be implemented.

FIG. 5 provides an illustrative overview of one computing environment 500, in which aspects and features disclosed herein may be implemented. The computing environment 500 may be configured as any suitable computing device capable of implementing a suggestive mapping device or service, and accompanying methods, such as, but not limited to those described with reference to FIGS. 1-4. By way of example and not limitation, suitable computing devices may include personal computers (PCs), servers, server farms, datacenters, or any other device capable of storing and executing all or part of the suggestive mapping system.

In one illustrative configuration, the computing environment 500 comprises at least a memory 502 and one or more processing units (or processor(s)) 504. The processor(s) 504 may be implemented as appropriate in hardware, software, firmware, or combinations thereof. Software or firmware implementations of the processor(s) 504 may include computer-executable or machine-executable instructions written in any suitable programming language to perform the various functions described.

Memory 502 may store program instructions that are loadable and executable on the processor(s) 504, as well as data generated during the execution of these programs. Depending on the configuration and type of computing device, memory 502 may be volatile (such as random access memory (RAM)) and/or non-volatile (such as read-only memory (ROM), flash memory, etc.). The computing device or server may also include additional removable storage 506 and/or non-removable storage 508 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 502 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing environment 500 may also contain communications connection(s) 510 that allow the computing environment 500 to communicate with a stored database, another computing device or server, user terminals, and/or other devices on a network. The computing environment 500 may also include input device(s) 512 such as a keyboard, mouse, pen, voice input device, touch input device, etc., and output device(s) 514, such as a display, speakers, printer, etc.

Turning to the contents of the memory 502 in more detail, the memory 502 may include an operating system 516 and one or more application programs or services for implementing a suggestive mapping system including a historical location data module 418. The historical location data module 418 may be configured to receive, determine, and/or store data regarding locations a user has previously visited. Additionally, the historical location data module 418 may also store the time and date of each visit. The historical location data module 418 may receive the data from a user's mobile device, from user applications, or the like.

The memory 502 may further include a travel vector determination module 520. The travel vector determination module 520 may be configured to determine a travel vector of a user, or the user's device, based on current location data of the user or device. In one aspect, a travel vector may include a user's current location, current velocity, and current direction of travel. Memory 502 may also include a destination prediction and ranking module 522 that may be configured to predict a destination of the user based on the historical location data from the historical location data module 518, the travel vector from the travel vector determination module 520, and/or predict a list of destinations that can be ranked prior to consumption by the user.

Additionally, the memory 502 may also include a map generation module 524 for preparing appropriately scaled maps of the predicted destinations. In one aspect, maps are generated by the map generation module 524 based on the predicted maps generated by the destination prediction module 522.

The memory 502 may further include a contextual input module 524. The contextual input module 524 may be configured to receive contextual data from one or more context sources, such as a GPS service, a calendar application, voicemail, a text messaging service, etc. In one aspect, the destination prediction module 522 may use data received by the contextual input module to determine, update, and/or reroute a predicted map to take contextual data into account. In one example, static contextual data (e.g., calendar appointments) may trump other contextual data (and maybe even historical data) in ranking the predictive maps. As such, a predictive map to a location of a meeting found in a calendar appointment may be ranked the highest of a set of predictive maps. Alternatively, in other examples, contextual data that is most recent may trump other contextual data such that the most recent telephone call, text message, IM, etc. may provide the location data that directs the destination prediction module 522 to predict and rank a destination.

Finally, the memory 502 may also include a map display module 528 for preparing, displaying, and/or serving the predictive maps generated by the destination prediction module 522. In one instance, the map display module 528 may render the predictive map(s) directly. However, in other aspects, the map display module 528 may prepare the predictive map(s) and serve them to a user device.

Illustrative methods and systems of suggestive mapping are described above. Some or all of these systems and methods may, but need not, be implemented at least partially by an architecture such as that shown in FIG. 5.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:
1. A method comprising:
  under control of one or more computing devices configured with executable instructions,
  receiving location information for one or more user devices over time, the location information including at least one of location information included in a calendar appointment of a user device of the one or more user devices, location information of a contact of a user device of the one or more user devices, or location information of a social network website;
  storing the location information;
  determining a current travel vector of a user device of the one or more user devices;

predicting a plurality of destinations of the user device, wherein the predicting is based at least in part on the stored location information and/or the determined current travel vector;

ranking the plurality of destinations based at least in part on an inferred likelihood of desirability of each destination of the plurality of destinations, the inferred likelihood of desirability being computed based at least in part on the stored location information and the determined travel vector, wherein the plurality of destinations include at least a first ranked destination and a second ranked destination;

preparing a plurality of maps, each map of the plurality depicting a route to the respective predicted destination;

displaying at least a first map of the route to the first ranked destination;

providing a user with an option to request a different predicted destination; and if a user request for the different predicted destination is received, then displaying at least a second map of the route to the second ranked destination.

2. The method of claim 1, wherein the stored location information for the one or more user devices over time comprises historical location information included in an electronic communication sent from or received by a user device of the one or more user devices, historical location information included in a calendar appointment of a user device of the one or more user devices, and/or historical location information of a contact of a user device of the one or more user devices.

3. The method of claim 1, wherein the computing device is a user device of the one or more user devices, and wherein determining a travel vector of the user device comprises detecting, by the user device, a current location, a current direction, and a current velocity of the user device and calculating the travel vector based at least in part on the current location, the current direction, and the current velocity.

4. The method of claim 3, wherein the prepared maps are displayed by an output device of the user device.

5. The method of claim 1, wherein the computing device is a remote computing device, and wherein determining a travel vector of the user device comprises receiving, from the user device, a current location, a current direction, and a current velocity of the user device and calculating the travel vector based at least in part on the current location, the current direction, and the current velocity.

6. The method of claim 5, further comprising sending, by an output device of the remote computing device, each of the first map of the route to the first ranked destination and the second map of the route to the second ranked destination to the user device.

7. The method of claim 1, wherein predicting the plurality of destinations is further based at least in part on contextual information of a user device.

8. The method of claim 7, wherein the contextual information of the user device comprises current location information of a user device of the one or more user devices, a current calendar appointment of a user device of the one or more user devices, a current electronic communication of a user device of the one or more user devices, current location information of a contact of a user device of the one or more user devices, and/or current calendar appointments of a contact of a user device of the one or more user devices.

9. The method of claim 1, wherein the map depicting the route for the user device to the predicted destination comprises a route from a predicted starting point to the predicted destination or from a current location of the user device to the predicted destination.

10. The method of claim 1, further comprising preparing for display, by one or more processors of the computing device, one or more maps depicting one or more travel instructions to the predicted destination.

11. The method of claim 10, wherein the computing device is a remote computing device, and further comprising sending, by an output device of the remote computing device, at least one of the one or more prepared maps to a user device of the one or more user devices based at least in part on the travel vector of the user device.

12. The method of claim 10, wherein the computing device is a user device of the one or more user devices, and further comprising displaying, by an output device of the user device, at least one of the one or more prepared maps based at least in part on the travel vector of the user device.

13. The method of claim 10, wherein the one or more maps are ranked based at least in part on an inferred likelihood of desirability of a user of the user device.

14. The method of claim 1, further comprising receiving, by an input device of the computing device, an indication of the request for the different predicted destination from the user, and wherein the indication is based at least in part on a physical gesture detected by a swipe or pattern of movement detected by an accelerometer of the computing device.

15. One or more computer-readable media storing computer-executable instructions that, when executed by a processor, perform acts comprising:

storing location information for a client device of a user over time, the location information including at least one of location information included in a calendar appointment of the client device, location information of a contact of the user of the client device, or location information of a social network website;

determining a travel vector of the client device;

predicting a plurality of destinations of the client device based at least in part on the stored location information and the determined travel vector;

ranking the plurality of destinations based at least in part on an inferred likelihood of desirability of each destination of the plurality of destinations, the inferred likelihood of desirability being computed based at least in part on the stored location information and the determined travel vector, wherein the plurality of destinations include at least a first ranked destination and a second ranked destination;

preparing a plurality of maps, each map of the plurality depicting a next travel instruction to the respective predicted destination;

displaying at least a first map including the travel instruction to the first ranked destination;

providing a user with an option to request a different predicted destination; and if a user request for the different predicted destination is received, then displaying at least a second map of the route to the second ranked destination.

16. The one or more computer-readable storage media of claim 15, wherein the stored location information for the client device of a user over time comprises historical location information of the client device, historical location information included in an electronic communication sent from or received by the client device, historical location information included in a calendar appointment of the client device, and/or historical location information of a contact of the user of the client device, and wherein selecting a most probable destination is further based on contextual information comprising a current location of the client device, a current calendar appointment of the client device, a current electronic communication of the client device, a current location of a contact of the user of the client device, a current calendar appointment of a contact of the user of the client device, and/or current traffic information.

17. The one or more computer-readable storage media of claim 15, wherein the map depicting the travel instruction to the respective predicted destination comprises a map depicting at least a next travel instruction to the respective predicted destination at a first velocity of the client device, a map depicting more than one next travel instructions to the respective predicted destination at a second velocity of the client device, or a map depicting each travel instruction i) from a predicted starting point to the respective predicted destination, or ii) from a current location of the client device to the respective predicted destination at a third velocity of the client device, wherein the first velocity is less than the second velocity and the second velocity is less than the third velocity.

18. A system comprising:
memory;
one or more processors communicatively coupled to the memory;
a location information module, stored in the memory and executable on the one or more processors, to maintain location information of a client device, the location information including at least one of location information included in a calendar appointment of the client device, location information of a contact of a user of the client device, or location information of a social network website;
a travel vector determination module, stored in the memory and executable on the one or more processors, to determine a travel vector of the client device based on a current location, a current travel direction, and a current velocity of the client device; and
a destination prediction module, stored in the memory and executable on the one or more processors, to predict a plurality of destinations of the client device based at least in part on the maintained historical location information and the determined travel vector of the client device, then rank the plurality of destinations based at least in part on an inferred likelihood of desirability of each destination of the plurality of destinations, the inferred likelihood of desirability being computed based at least in part on the location information and the determined travel vector, wherein the plurality of destinations include at least a first ranked destination and a second ranked destination;
a map generation module, stored in the memory and executable on the one or more processors, to generate a plurality of maps, each map of the plurality depicting at least a next travel instruction to the respective predicted destination; and
a map display module, stored in the memory and executable on the one or more processors, to display at least a first map including the travel instruction to the first ranked destination, provide a user with an option to request a different predicted destination, and if a user request for the different predicted destination is received, then display at least a second map including the travel instruction to the second ranked destination.

19. The system of claim 18, further comprising:
a contextual input module, stored in the memory and executable on the one or more processors, to receive contextual information of the client device and/or a contact of a user of the client device, wherein the contextual information comprises current location information of the client device or a contact of the user of the client device, current appointment information of the client device or a contact of the user of the client device, current communication information of the client device or a contact of the user of the client device, and/or real-time information associated with travel to the predicted destination, wherein the destination prediction module further predicts the destination of the client device based at least in part on the contextual information of the client device.

* * * * *